United States Patent
Diehl

(10) Patent No.: US 7,167,599 B1
(45) Date of Patent: Jan. 23, 2007

(54) METHOD AND DEVICE FOR CONTROLLING MULTIMEDIA DATA WATERMARK

(75) Inventor: Eric Diehl, Liffré (FR)

(73) Assignee: Thomson Licensing, Boulogne (FR)

( * ) Notice: Subject to any disclaimer, the term of this patent is extended or adjusted under 35 U.S.C. 154(b) by 450 days.

(21) Appl. No.: 10/275,033

(22) PCT Filed: Apr. 27, 2000

(86) PCT No.: PCT/FR01/01332

§ 371 (c)(1),
(2), (4) Date: Oct. 30, 2002

(87) PCT Pub. No.: WO01/84825

PCT Pub. Date: Nov. 8, 2001

(30) Foreign Application Priority Data

May 3, 2000 (FR) .................................. 00/05616

(51) Int. Cl.
*G06K 9/36* (2006.01)
(52) U.S. Cl. .................... 382/280; 382/243; 380/201
(58) Field of Classification Search .............. 382/100, 382/156, 162, 168, 106, 232, 233, 243, 250, 382/260, 280, 305; 380/54, 201; 713/176; 358/426.02; 345/555
See application file for complete search history.

(56) References Cited

U.S. PATENT DOCUMENTS

| | | | | |
|---|---|---|---|---|
| 5,949,885 A | * | 9/1999 | Leighton | ..................... 380/54 |
| 5,991,426 A | * | 11/1999 | Cox et al. | ................... 382/100 |
| 6,131,161 A | * | 10/2000 | Linnartz | ..................... 713/176 |
| 6,516,079 B1 | * | 2/2003 | Rhoads et al. | ............. 382/100 |
| 6,611,607 B1 | * | 8/2003 | Davis et al. | ................ 382/100 |

FOREIGN PATENT DOCUMENTS

| | | |
|---|---|---|
| EP | 0892544 | 1/1999 |
| EP | 0898396 | 2/1999 |

* cited by examiner

*Primary Examiner*—Kanjibhai Patel
*Assistant Examiner*—Seyed Azarian
(74) *Attorney, Agent, or Firm*—Joseph J. Laks; Robert D. Shedd; Paul P. Kiel

(57) ABSTRACT

A method for controlling the watermarking of a set of multimedia data includes performing a first detection operation for detecting the presence of a first type of watermark in the multimedia data and generating a first partial authorization or prohibition parameter in response to this first detection operation. The method further performs a second detection operation for detecting the presence of a second type of watermark in the multimedia data and generates a second partial authorization or prohibition parameter in response to this second detection operation. A final authorization or prohibition parameter is then generated on the basis of the partial authorization or prohibition parameters generated to authorize or prohibit the transmission of the multimedia data. A device for carrying out the method is also proposed.

17 Claims, 8 Drawing Sheets

METHOD AND DEVICE FOR CONTROLLING MULTIMEDIA DATA WATERMARK

This application claims the benefit, under 35 U.S.C. § 365 of International Application PCT/FR01/01332, filed Apr. 27, 2000, which was published in accordance with PCT Article 21(2) on Nov. 8, 2001 in French and which claims the benefit of French patent application No. 00/05616 filed May 3, 2000.

BACKGROUND OF THE INVENTION

1) Field of the Invention

The present invention relates to the field of combating the reproduction, representation or any other illicit use of multimedia data. More specifically it relates to controlling multimedia data watermarks.

2) Description of the Related Art

With the advent of sophisticated multimedia data reproduction means, the general consumer electronics field faces the problem of illicit copies. A user should not be able to illegally copy analog or digital multimedia data. The present situation of audio CD, CD-ROM and MP3 files pirating illustrates the magnitude of this problem.

Current proposals (such as XCA, 5C, 4C, JAWS and GALAXY for example) use two basic technologies: encryption and watermarking. The invention relates more specifically to data watermarking methods and devices which have advantages associated with robustness without resorting to keys.

It is recalled that watermarking multimedia data consists in inserting an imperceptible or almost imperceptible item of information into these data. This information may relate especially to copying rights or prohibitions. Chapter 18 "A review of watermarking principles and practices" in the book "IEEE Digital Signal Processing for Multimedia Systems" written by I. J. Cox, M. Miller, J. P. Linnartz and T. Kalker, edited by K. K. Parhi and T. Nishitani in 1999, provides a description of the principles of watermarking multimedia digital data.

For a specific example of the JAWS technology developed by PHILIPS, one may refer to the article "A video watermarking system for broadcast monitoring" written by Ton Kalker, Geert Depovere, Jaap Haitsma and Maurice Maes, published in 1999 in "Proceedings SPIE, 3657 Security and Watermarking of Multimedia content".

It transpires that security is an endless race between the ingenuity of the fraudsters and measures for combating illicit copies. Thus, watermarking techniques evolve over time without any compatibility being guaranteed between generations of watermarking. This poses two problems:

first generation multimedia data players cannot control copying of data containing only second generation watermarks;
similarly, second generation players cannot control copying of data containing only first generation watermarks.

There is a similar problem when two different watermarking technologies are offered on the market. One player cannot analyse both kinds of watermarking.

BRIEF SUMMARY OF THE INVENTION

The object of the present invention is to solve the aforementioned problems.

More specifically, one of the objectives of the present invention is to enable a method and/or device for controlling multimedia data watermarking to carry out certain operations, in particular:

the detection of several kinds of watermarking,
the extraction of corresponding information,
the generation of partial authorizations or prohibitions on playing, recording and/or performing a given process on all or part of these multimedia data according to the type(s) of watermarks detected, the possible information extracted and/or external parameters
the generation of final authorizations or prohibitions according to the partial authorizations or prohibitions generated and/or
the transmission of authenticated multimedia data intended for a use authorized by a final authorization applying to these data The invention also has the aim of enabling the watermark control methods and devices to update parameters for watermarks or operations as previously described.

Another aim of the invention is the insertion of watermark parameters corresponding to a new type of watermark and/or new operations as previously described.

To this end, the invention proposes a method of controlling the watermarking of a set of multimedia data including a step of performing a first detection operation capable of detecting a first type of watermark noteworthy in that it includes a step of performing at least a second detection operation capable of detecting at least a second type of watermark.

Thus the invention can be used for performing operations for detecting at least two different types of watermark. Hence, different generations of watermarks and/or those offered by different producers can be advantageously detected.

According to a particular characteristic, the method for controlling watermarking is noteworthy in that it includes a step of inserting detection information necessary for performing at least one of the second detection operations.

Thus, advantageously, the invention enables an upgrading of the methods or means of watermark detection which can thus be adapted to new generations of watermarks without, however, losing the ability to detect older generations.

According to a particular characteristic, the method for controlling watermarking is noteworthy in that it further includes an operation of updating at least one of the detection operations.

Thus, the invention can update or replace a method or means of existing watermark detection capable of detecting a first or a second type of watermark according to any criterion.

Thus, thanks to its possibilities of updating or installing methods or means of detection, the invention advantageously offers great flexibility of use whilst allowing relatively economic implementation.

According to a particular characteristic, the method for controlling watermarking is noteworthy in that when a watermark is detected, at least one of the detection operations performed is followed by an operation of extracting information from the detected watermark.

Thus, the invention enables the extraction of relatively rich information which may subsequently be used for authorizing or prohibiting the use of multimedia data for playing, recording and/or any processing whatsoever.

According to a particular characteristic, the method for controlling watermarking is noteworthy in that an operation of generating at least one partial authorization or prohibition parameter is associated with each of the detection operations, taking into account the result of the detection operation.

Thus, the invention takes advantage of the detection of each type of watermark and any possible information extracted to generate an authorization or prohibition parameter.

According to a particular characteristic, the method for controlling watermarking is noteworthy in that the generation operation further takes into account at least one parameter external to the detection operation associated with it.

According to a particular characteristic, the method for controlling watermarking is noteworthy in that the external parameter includes a signature validation and/or information on the presence or absence of encryption and/or information identifying a recordable or non-recordable type of medium.

This characteristic is especially advantageous since it enables account to be taken not only of characteristics specific to the watermark, but also of external parameters which may be important for assigning authorizations or prohibitions.

According to a particular characteristic, the method for controlling watermarking is noteworthy in that it further includes a step of updating at least one of the operations of generating and/or installing a new operation of generating at least a partial authorization or prohibition parameter.

Thus, the invention advantageously enables an upgrading of the methods or means of generating parameters.

According to a particular characteristic, the method for controlling watermarking is noteworthy in that it further includes at least an operation of generating at least a final authorization or prohibition parameter, each final authorization parameter taking into account at least a part of the partial authorization or prohibition parameters.

Thus, the invention is advantageously used to take into account all or part of the partial authorizations or prohibitions to generate final authorizations or prohibitions.

According to a particular characteristic, the method for controlling watermarking is noteworthy in that the operation of generating a final authorization or prohibition parameter includes a Boolean operation of the set of partial authorization or prohibition parameters.

Thus, the invention is advantageously especially simple to implement.

According to a particular characteristic, the method for controlling watermarking is noteworthy in that the operation of generating a final authorization or prohibition parameter further takes into account a priority associated with at least one parameter out of the partial authorization or prohibition parameters.

Thus, the invention advantageously uses the partial authorization or prohibition parameters in a very complete and subtle way.

According to a particular characteristic, the method for controlling watermarking is noteworthy in that it further includes an operation of updating at least one of the operations of generating a final authorization or prohibition parameter and/or installing at least a new operation of generating a final authorization or prohibition parameter.

Thus, all the means and methods of the detection chain up to the transmission of authorized data can advantageously follow the upgrading not only of the types of watermarks, but also of the types of authorizations and prohibitions likely to be used.

According to a particular characteristic, the method for controlling watermarking is noteworthy in that at least one of the final authorization or prohibition parameters belongs to the group including:
- a parameter for authorizing or prohibiting the playing of all or part of the set of multimedia data.
- a parameter for authorizing or prohibiting the recording of all or part of the set of multimedia data.
- a parameter for authorizing or prohibiting a given processing of all or part of the set of multimedia data.

Thus, the invention advantageously enables each authorization parameter to be characterized according to a multimedia data use by a receiver.

According to a particular characteristic, the method for controlling watermarking is noteworthy in that it includes a step of transmitting authorized and/or non-prohibited data out of the multimedia data set.

Thus, the invention advantageously enables the transmission of authorized multimedia data.

According to a particular characteristic, the method for controlling watermarking is noteworthy in that it includes a step of downloading, via at least one downloading channel of the set of multimedia data, at least one item of information belonging to the group:
- of at least a datum necessary for the step of inserting detection information and/or the step of updating,
- of at least a datum necessary for the step of updating at least one of the operations of generating and/or installing a new operation of generating at least a partial authorization or prohibition parameter and
- of at least a datum necessary for the operation of updating at least one of the operations of generating a final authorization or prohibition parameter and/or installing at least a new operation of generating a final authorization or prohibition parameter.

Thus, advantageously, all the information necessary for updating a module and/or installing a new module can be downloaded via the same channel, which simplifies the implementation of such updating and/or installation and may make it locally or remotely automatic.

The invention also proposes a multimedia terminal noteworthy in that it includes means of controlling watermarking using a watermark control method such as that previously described.

The invention further proposes a device for controlling the watermarking of a set of multimedia data including a first means of detection capable of detecting a first type of watermark and intended to cooperate with a multimedia terminal noteworthy in that it includes at least a second means of detection capable of detecting at least a second type of watermark.

Since the particular characteristics and advantages of the multimedia terminal, the watermark control device and the network including this device are the same as those for the watermark control method according to the invention, they are not repeated here.

The invention further proposes a computer program suitable for implementing a watermark control method as previously described.

The invention also proposes a means of storing information readable by a computer or a microprocessor noteworthy in that it stores the instructions of a computer program.

The invention also proposes a removable means of storing information, partially or totally readable by a computer or a microprocessor noteworthy in that it includes instruction sequences suitable for implementing a watermark control method as previously described.

Thus, the invention can be advantageously implemented in a hardware or software form.

BRIEF DESCRIPTION OF THE SEVERAL VIEWS OF THE DRAWING(S)

Other characteristics and advantages of the invention will appear on reading the following description of a particular embodiment, given as a simple, illustrative and non-restrictive example of the invention referring to FIGS. 1 to 9, in which.

DETAILED DESCRIPTION OF THE INVENTION

One of the general principles of the invention is based on operations carried out from a set of multimedia data, in particular the detection of several types of watermark, the extraction of watermark information, the handling of external parameters, the generation of partial or final authorizations or prohibitions and/or the transmission of all or part of multimedia data for an authorized use.

Another general principle of the invention is based on an updating of the previously described operations or on an installation of new operations as previously described.

A particular embodiment and several variants of the present invention are now described with the aid of FIGS. 1 to 9.

Figure 1:
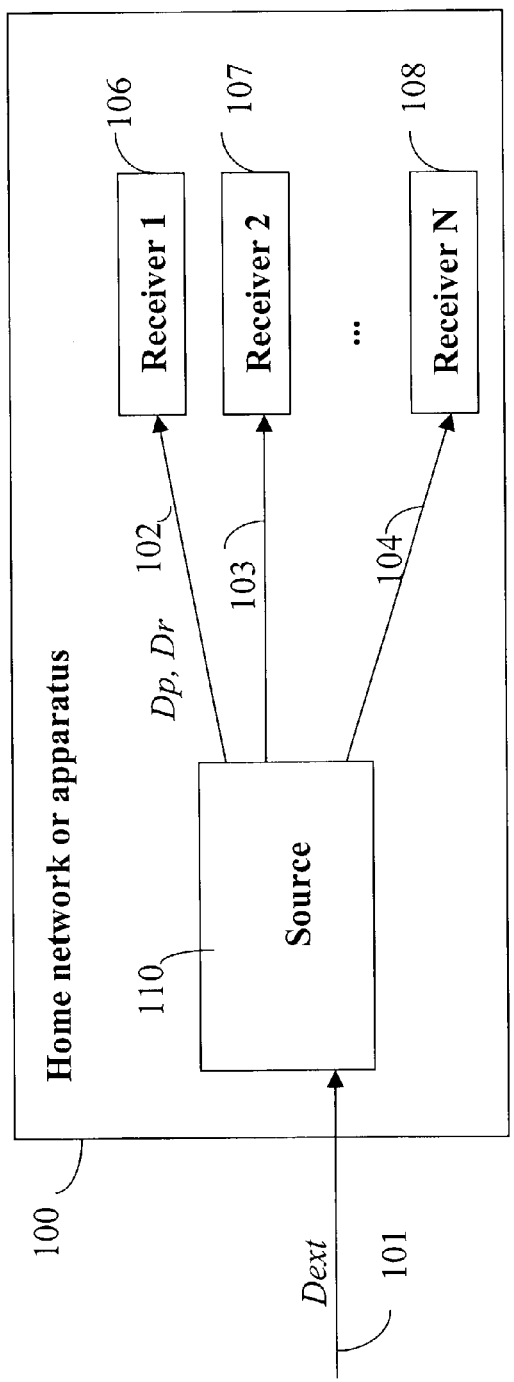
FIG. 1 is a schematic representation of a home network or apparatus comprising a source and several receivers conforming to a particular embodiment of the present invention.

FIG. 1 schematically illustrates a home multimedia network or apparatus 100.

The network or apparatus 100 comprises in particular:
a multimedia data source 110
N multimedia data receivers 106, 107 . . . 108 (N being an integer greater than or equal to one).

The source is a network or apparatus element whose role is to control the watermarking of multimedia data in order to deliver only authorized data to receivers suitable for playing (that is to say for example for representing or displaying), recording and/or generally processing multimedia data.

The source 110 accepts as input data Dext 101 having in particular:
multimedia data including or capable of including one or more watermarks and/or
parameters appropriate to the updating or addition of watermarks.

The source 110 supplies data with authorization Dp, Dr at outputs 102, 103, . . . 104 respectively inputs of receivers 106, 107, . . . 108.

In the case of a home network 100, the source 110 is for example a multimedia digital decoder (set top box) connected to several peripheral receivers 106 to 108 such as television sets, video tape recorders, DVD recorder.

In the case of a home apparatus 100 such as, for example, a video tape recorder or audio CD, CD-ROM, DVD or audio-video cassette player-recorder, the source 110 and the receivers 106 to 108 are built into the same apparatus.

Figure 2:
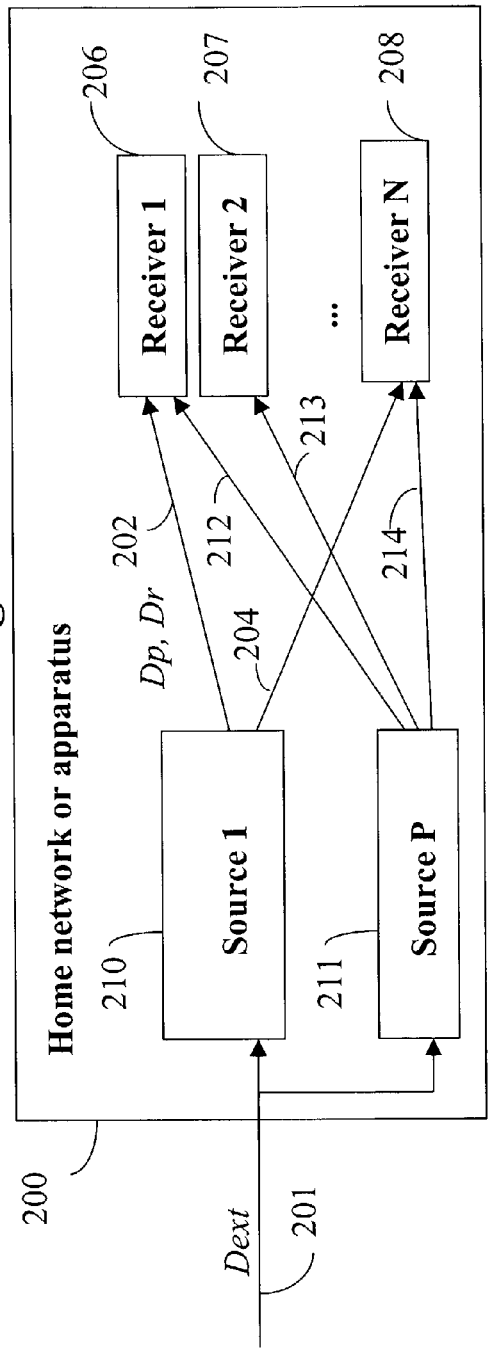
FIG. 2 is a schematic representation of a home network or apparatus comprising several sources and several receivers conforming to a particular embodiment of the present invention.

FIG. 2 schematically illustrates a home multimedia network or apparatus 200 including several sources.

The network or apparatus 200 comprises in particular:
P multimedia data sources 210 . . . 211 (P here being an integer greater than or equal to two)
N multimedia data receivers 206, 207 . . . 208 (N being an integer greater than or equal to one)

The source 210 (respectively 211) accepts as input data Dext 201 similar to the data 101 mentioned with regard to FIG. 1 and supplies data with authorization Dp, Dr at outputs 202 to 204 (respectively 212 to 214).

The receiver 206 accepts the data with authorizations Dp, Dr 202 and 212 as input.

Similarly, the receiver 207 accepts the data with authorizations Dp, Dr 213 as input. (It should be noted that all the receivers and sources are not necessarily connected)

Similarly, the receiver 208 accepts the data with authorizations Dp, Dr 204 and 214 as input.

In the case of a home network 200, the sources 210 to 211 (respectively the receivers 206 to 208) may be of the same type as the source 110 (respectively the receivers 106 to 108) illustrated in FIG. 1.

Figure 3:
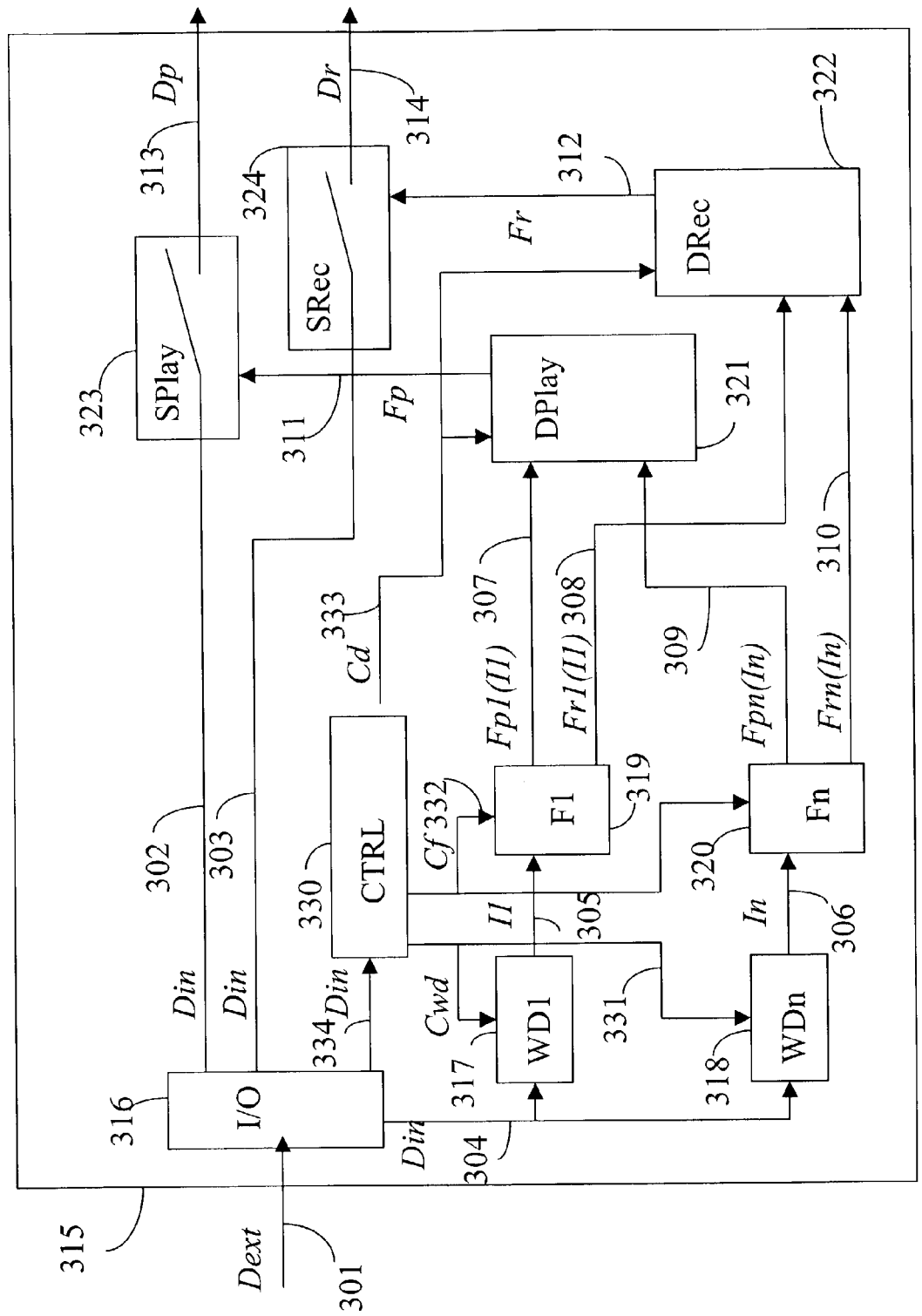
FIG. 3 is a block diagram of a watermark controller conforming to a particular embodiment of the present invention.

FIG. 3 shows a general flow diagram of a watermark controller or control device 315 as installed in a source 110, 210 or 211.

The watermark controller 315 comprises in particular:
an input/output port I/O 316
n detection modules WD1 317 to WDn 318 (n being an integer greater than or equal to one)
n partial authorization generation modules Fi 319 to 320
two final decision modules Dplay 321 and Drec 322
two switches Splay 323 and Srec 324
an adding and updating control module 330.

The input/output port 316 accepts as input multimedia data Dext 301 of the same type as the data 101 and 201 described in relation to FIGS. 1 and 2.

It formats these data Dext 301 at outputs Din 302, 303 and 304.

The detection module WD1 317 (resp. WDn 318) accepts as input the data Din 304, detects the possible presence of a first (resp. $n^{th}$) type of watermark in a sequence of multimedia data and where appropriate extracts information from the watermark.

The detection module WD1 317 (resp. WDn 318) supplies as output I1 305 (resp. In 306) a signal of non-detection of watermark if no watermark has been detected and the information extracted from the watermark if this is not the case.

The partial authorization generation module F1 319 (resp. Fn 320) accepts as input the information I1 305 (resp. In 306) and, based on this information, generates a partial authorization or prohibition on playing Fp1(I1) (resp. Fpn (In)) which it presents at an output 307 (resp. 309) or recording Fr1(I1) (resp. Frn(In)) presented at an output 308 (resp. 310). Playing is considered, for example, as an operation of representing or displaying multimedia data.

The play final decision module Dplay 321 accepts as input the partial authorizations or prohibitions on playing Fp1(I1) 307 to Fpn(In) 309. It generates a final authorization or prohibition signal on playing Fp at an output 311.

The record final decision module Drec 322 accepts as input the partial authorizations or prohibitions on recording Fr1(I1) 308 to Frn(In) 310. It generates a final authorization or prohibition signal on recording Fr at an output 312.

The play switch Splay 323 accepts as input the multimedia data Din 302 and the final authorization or prohibition on playing signal Fp 311. If the play authorization signal 311 is valid or in an equivalent manner if the play prohibition signal is invalid and only in these instances, the play switch 323 presents at its output 313 a sequence of multimedia data Dp, derived from the input sequence Din 302.

The record switch Srec 324 accepts as input the multimedia data Din 303 and the final authorization or prohibition on recording signal Fr 312. If the record final authorization signal 312 is valid or in an equivalent manner if the record prohibition signal is invalid and only in these instances, the record switch 324 presents at its output 314 a sequence of multimedia data Dr, derived from the input sequence Din 303.

The adding and updating control module 330 includes a data input 334. When the input data include a datum for updating one of the modules Wd1 317 to Wdn 318, the control module 330 updates this module via the intermediary of its output Cwd 331. When the input data include a datum for updating one of the modules F1 319 to Fn 320, the control module 330 updates this module via the intermediary of its output Cf 332. When the input data include a datum for updating one of the modules Dplay 321 or Drec 322, the control module 330 updates this module via the intermediary of its output Cd 333.

The control module 330 is responsible for adding additional modules to the watermark controller 315 when the input data 330 include data for additions of the corresponding modules. Thus, the control module 330 will be able, in particular, to add:

a watermark detection module WD(n+1) and/or
a partial authorization generation module F(n+1) and/or
a final decision module Dx and/or
a switch Sx.

In addition, the control module 330 will make the necessary input/output connections according to the modules added.

Figure 4:
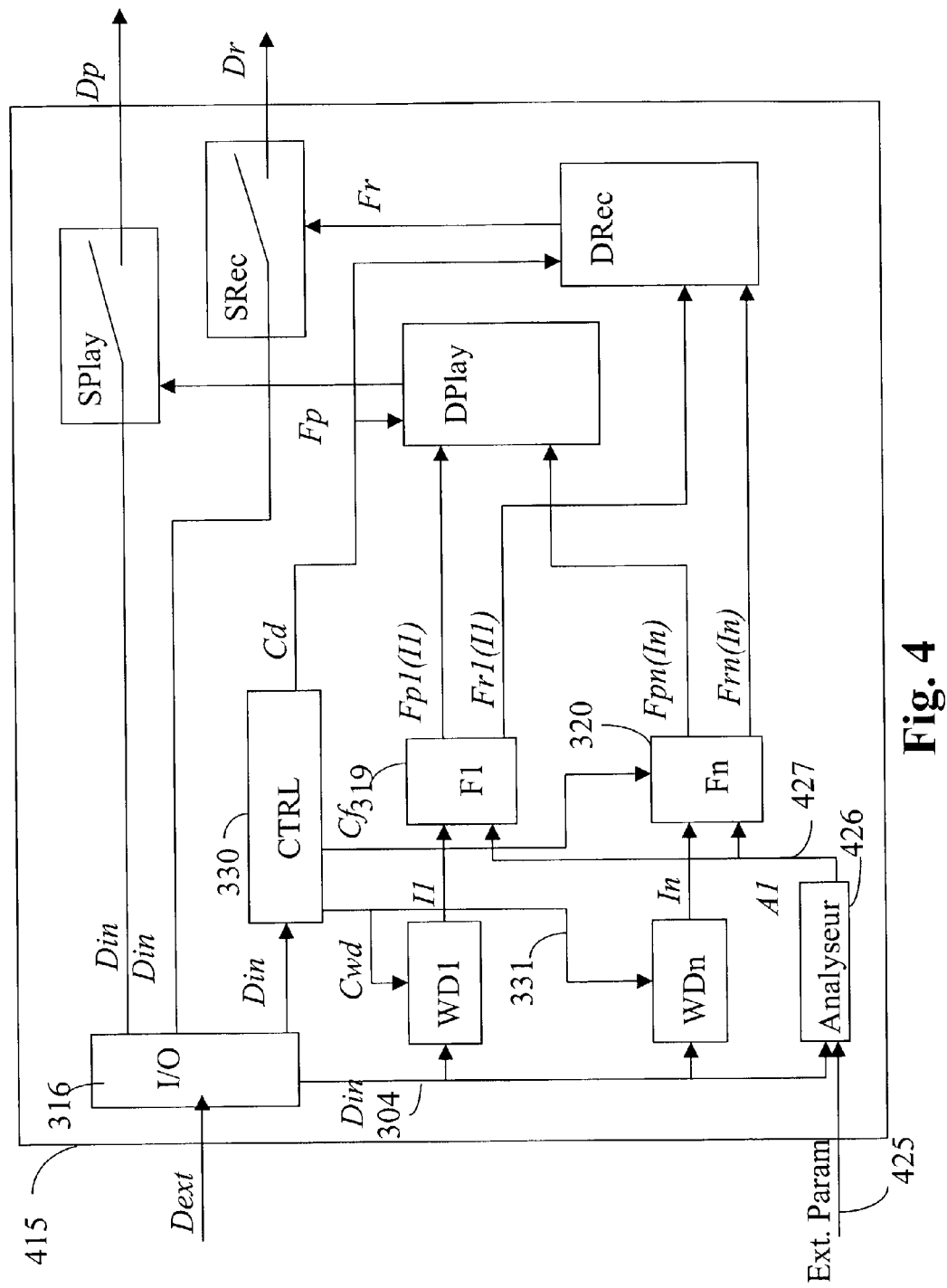
FIG. 4 is a block diagram of a watermark controller further including an external parameter analyser according to a first variant conforming to a particular embodiment of the present invention.

FIG. 4 shows a general flow diagram of a first variant 415 of watermark controller as installed in a source 110, 210 or 211.

The watermark controller 415 includes similar elements to those previously described in FIG. 3, which bear the same reference numbers and will not therefore be further described.

In addition to these elements, the watermark controller 415 includes an analyser 426 of external parameters. These external parameters may primarily include those for validation of signature and/or the presence of encrypted data and/or the presence of data identifying a recordable or non-recordable medium.

This analyser 426 takes into account:
the multimedia data present at an input Din 304
external parameters Ext Param at an input 425
The analyser 426 supplies an analysis result A1 at an output 427.

This output 427 is connected to an input of each of the partial authorization generation modules Fi 319 to 320 (i being an integer between 1 and n). Thus, to generate partial authorizations or prohibitions, each of the modules Fi takes into account not only the information Ii, resulting from the operation performed by the module Wdi but also a parameter external to the watermark.

Figure 5:
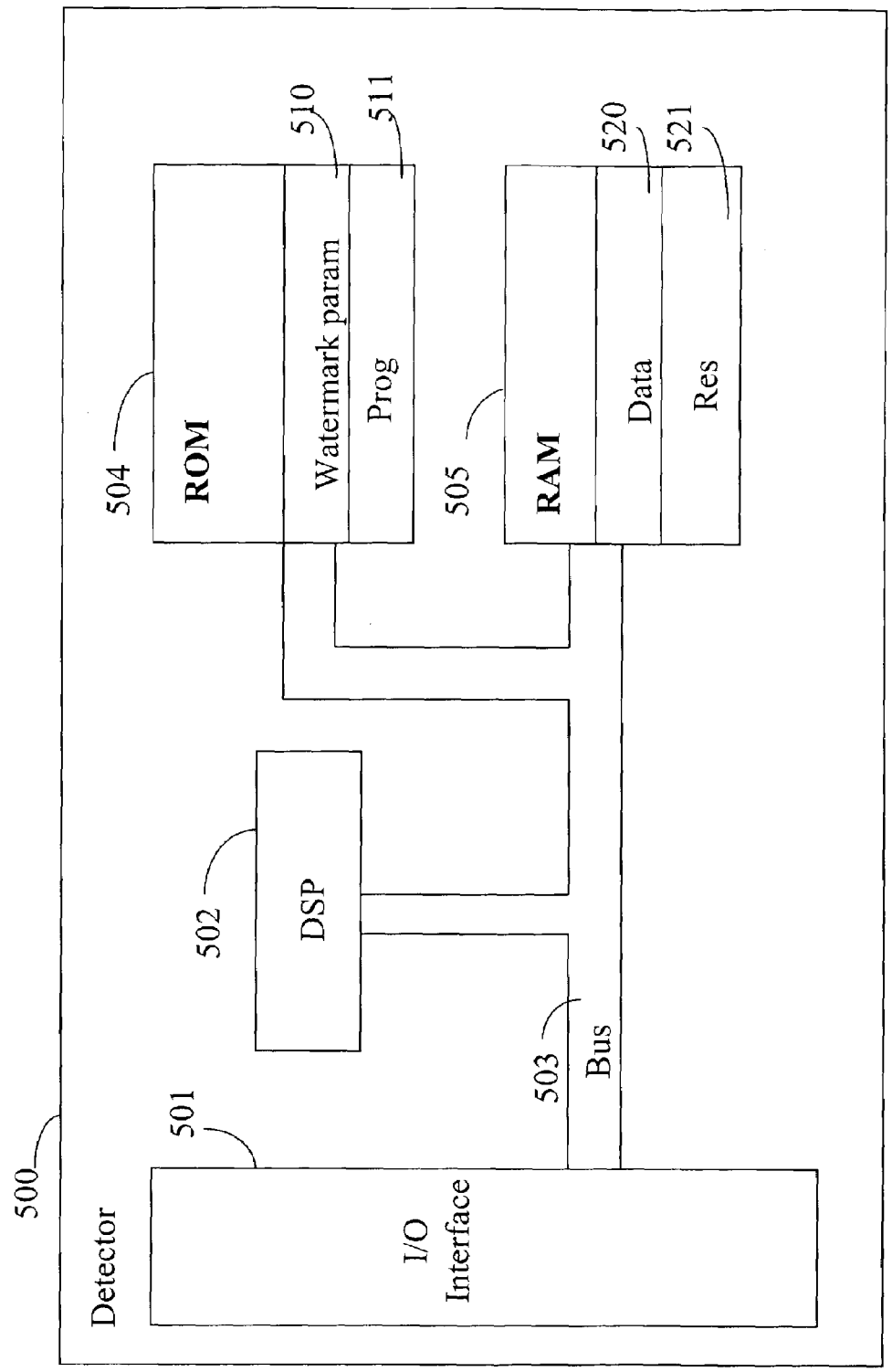
FIG. 5 is a schematic representation of a watermark control device conforming to a particular embodiment of the present invention.

FIG. 5 schematically illustrates a watermark detector 500. This detector is integrated into the source 110 described in relation to FIG. 1 or into each of the sources 210 to 211 described in relation to FIG. 2.

The detector 500 comprises, interconnected via an address and data bus 503:
a Digital Signal Processor (DSP) 502 suitable for implementing the flowcharts described in FIGS. 6 to 9;
an input/output port 501;
a random access memory 505;
a non-volatile memory 504.

Each of the elements illustrated in FIG. 5 is well-known to persons skilled in the art. These common elements are not described here.

It should be noted, however, that the input/output port 501 is suitable for accepting incoming signals representative of multimedia data originating from an external transmitter, not shown, such as a television programme broadcaster or a DVD, audio CD or CD-ROM drive. The port 501 is especially suitable for formatting these signals in the form of binary sequences that can be used by the processor 502. In addition, the port 501 is suitable for accepting outgoing authorized binary sequences and putting them in the form of outgoing signals representative of multimedia data intended for a receiver as described in relation to FIG. 1 or 2.

It should be further noted that the word "register" used in the description designates, in each of the memories 504 and 505, both a low capacity memory area (a few binary data) and a large capacity memory area (enabling an entire program or the whole of a multimedia data sequence to be stored).

The random access memory 505 stores data, variables and intermediate processing results in memory registers, which in the description bear the same names as the data whose values they store. The random access memory 505 notably includes:

a "data" register 520 in which the data Din are stored in the order in which they arrive on the bus 503,
a "res" register 521 in which are stored the results of the various operations, including I1 to In, Fp1(I1) to Fpn (In), Fr1(I1) to Frn(In), Fp, Fr, Cwd, Cf, Cd, Dp, Dr.

When the first variant described in relation to FIG. 4 is set up, the "data" register 520 further includes external parameters and the "res" register 521 stores A1.

The non-volatile memory 504 stores in registers, which for convenience have the same names as the data they store:
the operating program of the processor 502 in a "prog" register 511,
the parameters 510 of the different watermarks used by the various modules described in relation to FIGS. 3 and 4 such as in particular the n detection modules WD1 317 to WDn 318, the n partial authorization generation modules F1 319 to Fn 320, the two final decision modules Dplay 321 and Drec 322, the two switches SPlay 323 and Srec 324 and the adding and updating control module 330 and, if it is present, the analyser module 426.

The non-volatile memory 504 is preferably of the EEPROM type so that the watermarking parameters 510 can be updated or added.

When the first variant is implemented, the external parameters originate from an external entity, not shown. This entity may be, for example, a means of signature validation and/or of detecting the presence of encrypted data and/or of detecting the presence of data identifying a recordable or non-recordable medium.

Figure 6:
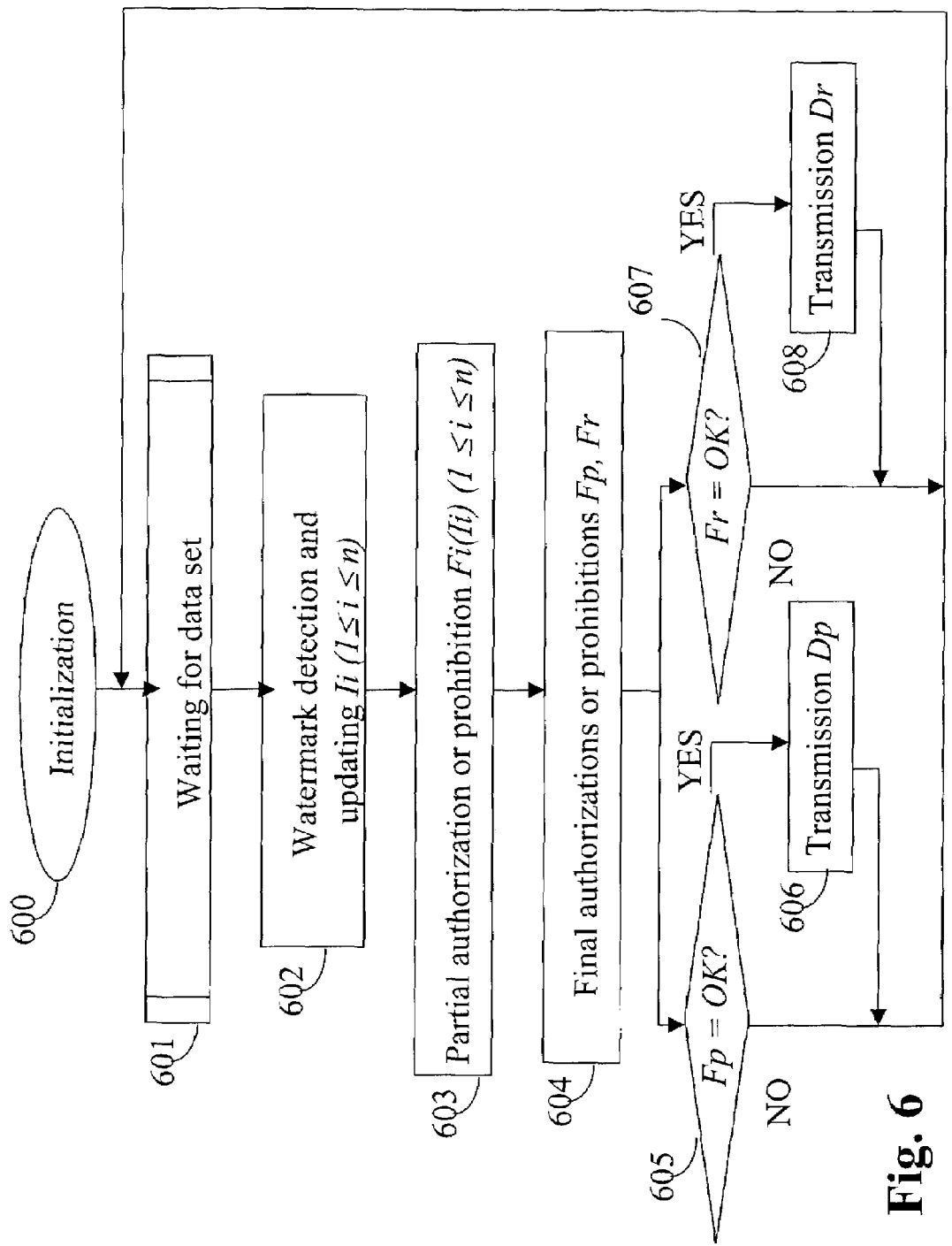
FIG. 6 is flowchart of a watermark control method conforming to a particular embodiment of the present invention.

In FIG. 6, which shows the operation of a watermark control device such as that included in the electronic device illustrated in FIG. 5, it should be noted that after an initialization operation 600 during which the random access memory 505 registers are initialized, in the course of a standby operation 601 the processor 501 waits to receive then receives a sequence of multimedia data.

Then, during a detection operation 602, the processor 502 detects the possible presence of a watermark of the $i^{th}$ type and updates the information Ii of the register 521 in the memory 505 for each value of the integer i from 1 to n (n being the number of watermark detectors installed when the operation takes place).

Then, during a partial authorization or prohibition operation 603, the processor 502 updates the partial authorization or prohibition information Fpi(Ii) and Fri(Ii) of the register 521 in the memory 505 for each value of an integer i from 1 to n.

The partial authorization or prohibition on playing Fpi(Ii) is a Boolean variable indicating whether the multimedia data sequence in question can be played, i.e. in particular whether it can be displayed (if it is an image) or broadcast. Fpi(Ii) will be true if playing is legal or if no watermark has been detected by WDi. In the second variant, Fpi(Ii) will be true if playing is legal and if a watermark has been detected by WDi.

Commonly, first generation watermarks may contain information of the "Copy Generation Management System" type: "copy-freely", "copy-once", "copy-no-more" and "copy-never". Thus, the processor 502 updates the partial authorization or prohibition on copying Fri(Ii) for each type of watermark capable of being detected according to the type of information extracted Ii: Fri(Ii) is a Boolean variable that indicates whether the multimedia data sequence in question can be copied. Fri(Ii) will be true if recording is legal or if no watermark has been detected by WDi. In the third variant, Fri(Ii) will be true if recording is legal and if a watermark has been detected by WDi.

Next, during a final authorization operation 604, the processor 502 generates the final authorizations or prohibitions Fp and Fr.

The final authorization or prohibition on playing Fp will be specifically obtained thanks to a Boolean operation performed on all the partial authorizations or prohibitions on playing. In preference, this function will be of the logical "and" type denoted by "&&" in the following text. Thus:

Fp=Fp1(I1)&&Fp2(I2)&& . . . &&Fpn(In).

However, any other type of Boolean function may be used. An inclusive or exclusive logical "or" operation may be performed for example. In this case, Fp=Fp1(I1)ORFp2(I2)OR . . . ORFpn(In). Priorities may also be assigned to partial authorizations or prohibitions; for example, the most recent watermark version detected may be identified and only this be considered for authorization to play.

In the same way, the final authorization or prohibition on recording Fr will be specifically obtained thanks to a Boolean operation performed on all the partial authorizations or prohibitions on recording. In preference, this function will be of the logical "and" type denoted by "&&" in the following text. Thus, Fr=Fr1(I1)&&Fr2(I2)&& . . . &&Frn(In).

However, any other type of Boolean function may be used. An inclusive or exclusive logical "or" operation may be performed for example. In this case, Fr=Fr1(I1)ORFr2(I2)OR . . . ORFrn(In). Priorities may also be assigned to partial authorizations or prohibitions; for example, the most recent watermark version detected may be identified and only this be considered for authorization to record.

Next, during a test 605, the processor 502 checks whether the final authorization to play Fp is valid. If so, during a data transmission operation for playing 606, it authorizes the transmission and transmits the data Dp intended to be played.

In parallel with the test 605 or possibly following the test 605, during a test 607, the processor 502 checks whether the final authorization to record Fr is valid. If so, during a data transmission operation for recording 608, it authorizes the transmission and transmits the data Dr intended to be recorded.

Then when the tests 605 and 607 have been carried out, together with the possible data transmission operations 606 and 608, the standby operation 601 is repeated and the random access memory 505 registers are reinitialized.

Figure 7:
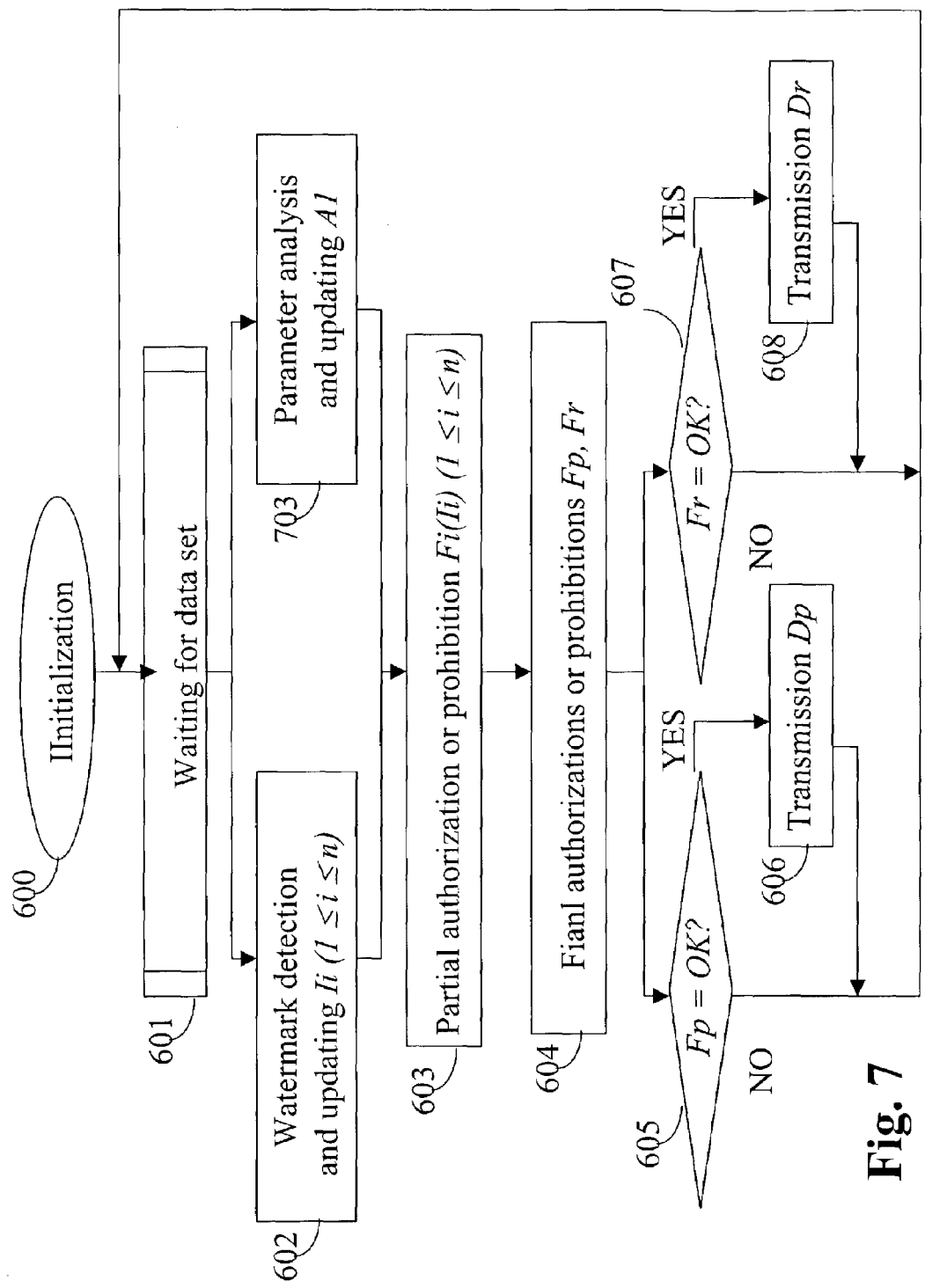
FIG. 7 is a flowchart showing details of a watermark control method further including an external parameter analysis operation according to a first variant conforming to a particular embodiment of the present invention.

FIG. 7 shows the operation of a watermark control device such as that included in the electronic device illustrated in FIG. 5, according to the first variant of the invention.

The flowchart in FIG. 7 includes similar operations to those previously described in FIG. 6, which bear the same reference numbers and will not be further described.

It should be noted, however, that in parallel with the detection operation 602, an analysis of external parameters is carried out during an analysis operation 703. It is recalled that these external parameters may primarily be of the type for validation of signature and/or the presence of encrypted data and/or the presence of data identifying a recordable or non-recordable medium. The processor 502 takes the result of this analysis into account for generating an analysis result signal A1.

It should be noted that after the operations of detection 602 and analysis 703, for each integer i between 1 and n, the operation of partial authorization or prohibition 604 described previously may further take account of the analysis result A1 for example by performing a Boolean operation between a part of the information Ii and the analysis result A1. Thus, if A1 prohibits copying (if, in particular, a signature is not valid), Fri(Ii) will prohibit copying whatever the information Ii may be.

Figure 8:
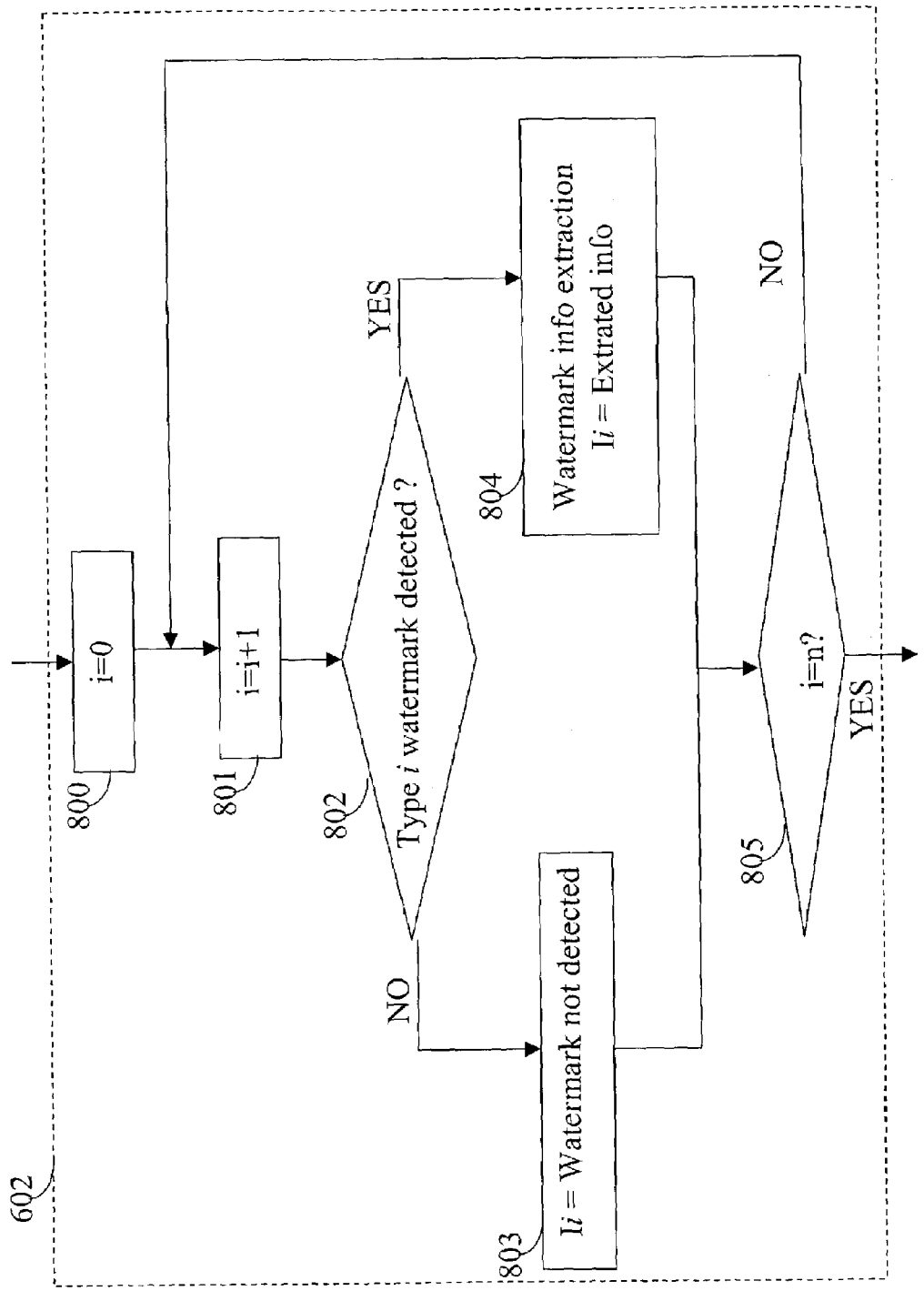
FIG. 8 is a flowchart showing details of an operation for detecting watermarking and extracting watermark information.

FIG. 8 shows details of the detection operation 602 mentioned in relation to FIGS. 6 and 7 and symbolized by dotted lines in FIG. 8.

During an initialization operation 800, a counter i is initialized to 0.

Then, during an incrementation operation 801, the counter i is incremented by one unit.

Next, during a test 802, the processor 502 tries to detect the presence of an $i^{th}$ known type of watermark in the data sequence 520 in the random access memory 505, according to the parameters 510 present in the ROM 504.

If the result of the test 802 is negative, i.e. if no $i^{th}$ type of watermark is detected, the processor 502 updates the information Ii during an updating operation 803 to indicate that no $i^{th}$ type of watermark has been detected.

When the result of the test 802 is positive, the processor 502 extracts the watermark information of the $i^{th}$ type during an extraction and updating operation 804, according to the parameters 510 present in the ROM 504 and updates this information in Ii.

After one of the operations 803 or 804, during a test 805, the processor 502 checks whether the counter i has reached the value n stored in memory. If i and n are equal, the operation 602 is terminated. Otherwise, the incrementation operation 801 is repeated.

Figure 9:
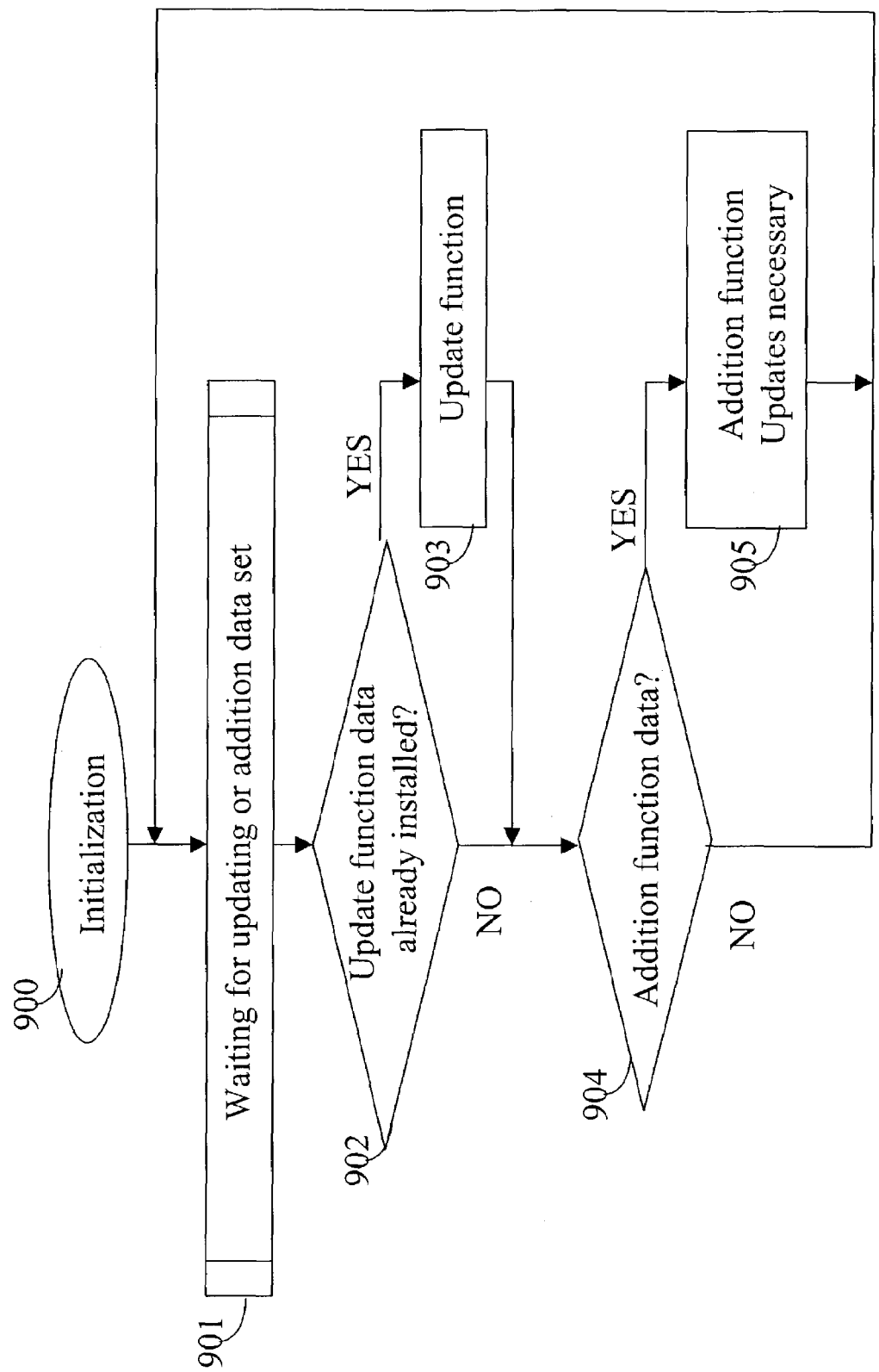
FIG. 9 is flowchart of updating parameters corresponding to a given type of watermark or adding one or more modules conforming to a particular embodiment of the present invention.

FIG. 9 describes a function for updating parameters or adding (also called installing) one or more modules such as, for example, a watermark detection module, an analyser, a module for generating partial authorizations or prohibitions, a module for generating final authorizations or prohibitions, or a switch.

After an operation 900 of initializing parameters 510 appropriate to the modules present in the EEPROM memory 504, during a standby operation 901, the processor 502 goes on standby waiting for updating or addition data. These data pass through the interface 501. In preference, they will follow the same channel as the multimedia data, but may derive from diverse and varied origins according to data downloading procedures well-known to persons skilled in the art.

When updating or addition data have been received, the processor 502 checks during a test 902 whether the data correspond to a simple update of one or more modules already installed such as a watermark detection module WDi and/or a partial authorization Fi generation module and/or a final decision Dp or Dr module and/or a switch Sp or Sr.

When the result of the test 902 is positive, in the course of an updating operation 903, the processor 502 updates the module or modules to which the updating data correspond.

Then, when the result of the test 902 is negative or after the updating operation 903, the processor 502 in the course of a test 904 checks whether the data received correspond to an addition function.

When the result of the test 904 is positive, in the course of an installation operation 905, the processor 502 adds the module or modules to which the updating data correspond, together with the necessary new connections between modules.

It should be noted that if a new watermark detection module WD(n+1) is added, this involves installing a new partial authorization or prohibition generation module F(n+1), an update of the final authorization modules and the establishment of connections between the input/output port 316 and WD(n+1), between WD(n+1) and F(n+1), between F(n+1), DPlay and DRec and between the analyser 426 if it is present and F(n+1).

It should also be noted that if a final authorization or prohibition module is added, a new switch and the associated output must also be added, all the partial authorization or prohibition modules updated and the connections established between the added final authorization or prohibition module and between all the partial prohibition modules and the new switch.

Of course, the invention is not limited to the abovementioned examples of embodiment.

In particular, a person skilled in the art could introduce any variant into the definition of the types of operations capable of being authorized by a data watermark or external parameters, into the definition itself of these external parameters and into the operations for obtaining the final authorizations or prohibitions from partial authorizations or prohibitions.

It will also be noted that the invention is not limited to simple playing or recording authorizations or prohibitions, but may be applied in particularizing certain types of playing or recording. It should further be noted that the invention can be applied to authorizations or prohibitions of any type of processing on multimedia data such as filters, modifications of original data sequences, and extractions of a part of the data sequences. It will also be noted that the invention relates to digital and/or analog multimedia data.

It will be noted that the invention is not limited to a purely hardware installation, but that it may also be implemented in the form of an instruction sequence in a computer program or any mixed, part hardware, part software form. In the case where the invention is installed partially or totally in software form, the corresponding instruction sequence may be stored on a removable means of storage (such as, for example, a floppy disk, a CD-ROM or a DVD-ROM) or a non-removable means, this means of storage being partially or totally readable by a computer or a microprocessor.

The invention claimed is:

1. Method for controlling the watermarking of a set of multimedia data including the steps of:
   detecting the presence of a first type of watermark in said multimedia data;
   generating a first partial authorization or prohibition parameter in response to said first detecting step;
   detecting the presence of at least one second type of watermark in said multimedia data;
   generating a second partial authorization or prohibition parameter in response to said second detecting step; and
   generating a final authorization or prohibition parameter in response to at least a part of said partial authorization or prohibition parameters.

2. Method for controlling watermarking according to claim 1, further comprising a step of inserting detection information necessary for performing at least one of said second detection operations.

3. Method for controlling watermarking according to claim 1, further comprising an operation of updating parameters necessary to perform at least one of said detection operations.

4. Method for controlling watermarking according to claim 1, wherein when a watermark is detected, the method further comprises, after the detection operation, an operation of extracting information from said detected watermark.

5. Method for controlling watermarking according to claim 1 wherein said operation of generating a partial authorization or prohibition parameter further takes into account at least one parameter resulting from an external parameter analysis carried out in parallel to the detection operation.

6. Method for controlling watermarking according to claim 5 wherein said external parameter includes a signature validation and/or information on the presence or absence of encryption and/or information identifying a recordable or non-recordable type of medium.

7. Method for controlling watermarking according to claim 1 further including a step of updating at least one of said operations for generating a partial authorization or prohibition parameter and/or a step of installing a new operation of generating at least a partial authorization or prohibition parameter.

8. Method for controlling watermarking according to claim 1 wherein said operation of generating a final authorization or prohibition parameter includes a Boolean operation on said set of partial authorization or prohibition parameters.

9. Method for controlling watermarking according to claim 1 wherein said operation of generating a final authorization or prohibition parameter further takes into account a priority associated with at least one parameter out of said partial authorization or prohibition parameters.

10. Method for controlling watermarking according to claim 1 further including a step of updating at least one of said operations of generating a final authorization or prohibition parameter and/or a step of installing at least one new operation of generating a final authorization or prohibition parameter.

11. Method for controlling watermarking according to claim 1 wherein at least one of said final authorization or prohibition parameters belongs to the group including:
- a parameter for authorizing or prohibiting the playing of all or part of said multimedia data;
- a parameter for authorizing or prohibiting the recording of all or part of said multimedia data;
- a parameter for authorizing or prohibiting a given processing of all or part of said multimedia data.

12. Method for controlling watermarking according to claim 1 further including a step of transmitting authorized and/or non-prohibited data out of said set of multimedia data.

13. Method for controlling watermarking according to claim 2 further including a step of downloading, via at least one downloading channel of said set of multimedia data, at least one item of information necessary for said step of inserting detection information.

14. Device for controlling the watermarking of a set of multimedia data including:

- a first detection module capable of detecting the presence of a first type of watermark in said multimedia data;
- a first generation module capable of generating a partial authorization or prohibition parameter;
- at least one second detection module capable of detecting the presence of at least one second type of watermark in said multimedia data;
- at least one second generation module capable of generating a partial authorization or prohibition parameter;
- a final decision module capable of generating at least one final authorization or prohibition parameter taking into account at least a part of said partial authorization or prohibition parameters.

15. Method for controlling watermarking according to claim 3 further including a step of downloading, via at least one downloading channel of said set of multimedia data, at least one item of information necessary for said step updating detection operations.

16. Method for controlling watermarking according to claim 7 further including a step of downloading, via at least one downloading channel of said set of multimedia data, at least one item of information necessary for said step of updating at least one of said operations of generating at least a partial authorization or prohibition parameter and/or for said step of installing a new operation of generating at least a partial authorization or prohibition parameter.

17. Method for controlling watermarking according to claim 10 further including a step of downloading, via at least one downloading channel of said set of multimedia data, at least one item of information necessary for said step of updating at least one of said operations of generating a final authorization or prohibition parameter and/or for said step of installing at least a new operation of generating a final authorization or prohibition parameter.

* * * * *